United States Patent
Satou et al.

(10) Patent No.: US 8,956,141 B2
(45) Date of Patent: Feb. 17, 2015

(54) DIE PIECE FOR EXTRUSION MOLDED NOODLES

(75) Inventors: Takuya Satou, Saitama (JP); Masahiro Higuchi, Saitama (JP)

(73) Assignee: Nisshin Foods Inc., Tokyo (JP)

( * ) Notice: Subject to any disclaimer, the term of this patent is extended or adjusted under 35 U.S.C. 154(b) by 0 days.

(21) Appl. No.: 13/982,659

(22) PCT Filed: Mar. 16, 2012

(86) PCT No.: PCT/JP2012/056843
§ 371 (c)(1),
(2), (4) Date: Jul. 30, 2013

(87) PCT Pub. No.: WO2012/124802
PCT Pub. Date: Sep. 20, 2012

(65) Prior Publication Data
US 2013/0344189 A1    Dec. 26, 2013

(30) Foreign Application Priority Data
Mar. 16, 2011    (JP) .................................. 2011-057396

(51) Int. Cl.
*A21C 11/16* (2006.01)
*A21C 3/04* (2006.01)
*A23L 1/16* (2006.01)

(52) U.S. Cl.
CPC ... *A21C 3/04* (2013.01); *A23L 1/16* (2013.01); *A21C 11/16* (2013.01)
USPC .................... 425/376.1; 425/382 R; 425/461; 425/464; 426/516

(58) Field of Classification Search
CPC .... A21C 11/16; A21C 11/163; A21C 11/166; A21C 11/18; A21C 11/20
USPC ........... 425/376.1, 382 R, 461, 464; 426/516
See application file for complete search history.

(56) References Cited

U.S. PATENT DOCUMENTS

| | | | | |
|---|---|---|---|---|
| 5,089,284 | A * | 2/1992 | Irvin et al. | 426/557 |
| 2001/0046544 | A1 * | 11/2001 | Debbouz et al. | 426/557 |

FOREIGN PATENT DOCUMENTS

| | | |
|---|---|---|
| JP | 62-99983 | 6/1987 |
| JP | 64-005443 | 1/1989 |
| JP | 07-246054 | 9/1995 |
| JP | 3038844 | 4/1997 |
| JP | 3038844 | 6/1997 |
| JP | 2007-197266 | 8/2007 |

OTHER PUBLICATIONS

International Search Report, PCT/JP2012/056843, Jun. 12, 2012.

* cited by examiner

*Primary Examiner* — James Sanders
*Assistant Examiner* — Joseph Leyson
(74) *Attorney, Agent, or Firm* — Young & Thompson

(57) ABSTRACT

A die piece for extrusion molded noodles is a die piece in which a contact angle of a water droplet on a die piece surface is 61 to 73 degrees and a water absorption of the die piece is 0.01 to 0.15% by weight after the die piece is immersed in water for 24 hours. The use of the die piece for extrusion molded noodles makes it possible to produce pasta, spaghetti, or any other extrusion molded noodles with no increase or decrease in its surface roughness (degree of surface roughness) over time and also makes it possible to stably produce, over a prolonged period of time, extrusion molded noodles having proper surface roughness.

8 Claims, No Drawings

DIE PIECE FOR EXTRUSION MOLDED NOODLES

TECHNICAL FIELD

The invention relates to a die piece for extrusion molded noodles. A plurality of such die pieces are generally installed in a die and used in the process of extruding noodle dough to form strands.

BACKGROUND ART

Pasta, spaghetti, or other injection noodle products are generally produced by extrusion of noodle dough through a die.

Usually, pasta is preferably formed to have proper surface roughness so that pasta sauce can stick to the pasta in a better way.

When conventional die pieces for extrusion molded noodles are used, pasta obtained immediately after the start of production has proper surface roughness, but the surface roughness of the produced pasta increases or decreases over time, which can cause a problem in that the pasta can become difficult to automatically feed and weigh. Conventionally, therefore, die pieces for extrusion molded noodles are replaced by new ones a certain period of time (about 48 hours) after the start of production.

Concerning techniques about die pieces for extrusion molded noodles, for example, Patent Literature 1 discloses an extrusion die piece for use in production of noodles, which has a substantially circular extrusion hole having projections that are spaced by a certain distance and protrude in a staggered fashion toward each other from circumference parts opposed to each other in the radial direction, wherein the projection tips extend to positions beyond the center line of the extrusion hole, respectively.

Patent Literature 2 discloses a die piece for extrusion molded noodles having one or more extrusion holes whose cross-section is substantially rectangular, wherein the extrusion hole has a pair of opposed convex-arc short sides and a pair of opposed linear long sides, one of the long sides has a convex part, and the other of the long side has a concave part.

However, the techniques disclosed in Patent Literatures 1 and 2 are all for modifying the cross-sectional shape of pasta, and any of them are not for controlling the surface roughness of pasta (degree of pasta surface roughness).

CITATION LIST

Patent Literature

Patent Literature 1: JP 7-246054 A
Patent Literature 2: Japanese Utility Model No. 3038844

SUMMARY OF INVENTION

Technical Problem

The invention has been accomplished in view of the problems with the conventional art and the current conditions, and an object of the invention is to provide a die piece for extrusion molded noodles which makes it possible to produce pasta, spaghetti, or any other extrusion molded noodles with no increase or decrease in its surface roughness (degree of surface roughness) over time and which also makes it possible to stably produce, over a prolonged period of time, extrusion molded noodles having proper surface roughness.

Solution to Problem

As a result of various studies to solve the above problems, the inventors have accomplished the invention based on the finding that the problems can be solved when die piece for extrusion molded noodles are formed using a molding material having specific physical properties.

Thus, according to the present invention, there is provided a die piece for extrusion molded noodles, wherein a contact angle of a water droplet on a die piece surface is 61 to 73 degrees and a water absorption of the die piece is 0.01 to 0.15% by weight after the die piece is immersed in water for 24 hours.

Advantageous Effects of Invention

The use of the die piece for extrusion molded noodles of the invention makes it possible to prevent an increase or decrease in the surface roughness (degree of surface roughness) of noodles over time and to stably produce, over a prolonged period of time, extrusion molded noodles having proper surface roughness.

DESCRIPTION OF EMBODIMENTS

The die piece for extrusion molded noodles of the invention is a die piece in which a contact angle of a water droplet on a die piece surface is 61 to 73 degrees, preferably 62 to 72 degrees, more preferably 66 to 72 degrees and a water absorption of the die piece is 0.01 to 0.15% by weight, preferably 0.01 to 0.1% by weight, after the die piece is immersed in water for 24 hours.

The contact angle is measured using 10 µl of a water droplet at 40° C. A test plate is made of the molding material for the die piece. The contact angle of the water droplet on the test plate (the temperature of the test plate: about 20° C.) is measured using a known conventional method.

If the contact angle is less than 61 degrees, the die piece will have relatively high hydrophilicity, which may cause noodles to have non-uniform surface roughness. If the contact angle is more than 73 degrees, the die piece will have relatively high water repellency, so that it may fail to allow doodles to have the desired surface roughness.

The water absorption is defined as the increase in weight of the die piece per unit weight of the die piece after immersion of the die piece in water at room temperature (15 to 25° C.) for 24 hours.

If the water absorption is less than 0.01% by weight, the surface state of pasta may be made unstable, which is not preferred. If the water absorption is more than 0.15% by weight, the surface roughness of noodles may increase over time.

The die piece having the above contact angle and water absorption can be produced through the selection of a molding material for the die piece.

The molding material is not restricted as long as it satisfies the above contact angle and water absorption. Although the molding material may be synthetic resin or metal, synthetic resin is preferable in that it makes easy the control of the surface roughness of noodles.

For example, such synthetic resin may be at least one of polytetrafluoroethylene, such as Teflon®, polyacetal, such as DURACON®, polycarbonate, polybutylene terephthalate, polyphenylene sulfide, polyethylene, and polypropylene, or a resin blend obtained by blending two or more of these resins. A particularly preferred example of such synthetic resin is a resin blend of 70 to 95% by weight, preferably 70 to 90% by weight of DURACON® and 5 to 30% by weight, preferably 10 to 30% by weight of high-density polyethylene.

The die piece for extrusion molded noodles of the invention may be in any shape, and may have the same shape as a die piece for extrusion molded noodles commonly used.

In the die piece for extrusion molded noodles of the invention, a surface to be brought into contact with noodle dough only has to be made of the molding material satisfying the above contact angle and the above water absorption, and the die piece does not have to be entirely made of the molding material satisfying the above contact angle and the above water absorption.

In the process of extruding noodle dough to form strands, a plurality of the die pieces for extrusion molded noodles of the invention may be installed in a die and used in the same manner as when conventional die pieces for extrusion molded noodles are used.

The die piece for extrusion molded noodles of the invention is suitable for use in production of extrusion molded noodles, and particularly suitable for use in production of pasta or spaghetti.

EXAMPLES

Hereinafter, the invention is more specifically described with reference to examples and comparative examples. It will be understood that the examples are not intended to limit the invention.

Example 1 and Comparative Examples 1 and 2

Each die piece for extrusion molded noodles was formed in the shape and size shown below using the molding material shown in Table 1. The contact angle and water absorption of each formed die piece are shown in Table 1.

Shape and size of die piece: a circular column 1 cm in diameter and 7 mm in height having eight through holes 1.67 mm in diameter formed at regular intervals On the other hand, based on the weight of durum wheat semolina, 20 to 40% by weight of water was added to the durum wheat semolina, and they were mixed using a pasta machine (MAC60 manufactured by ITALPAST S.r.l.) to form pasta dough.

The pasta dough was extruded at a degree of vacuum of −0.5 to −0.9 kgf/cm$^2$ using a die installing each specific die piece shown above.

The extruded pasta was hung on rods and dried to a water content of 12% in a drier (PR-4KP manufactured by ESPEC Corp.) so that long dried pasta strands (250 mm long, 1.7 mm thick) with a circular cross-section were obtained in each case.

The dried pasta produced in each of Example 1 and Comparative Examples 1 and 2 was measured for surface roughness (degree of surface roughness) every 24 hours from immediately after the start of the production (0 hours) to 120 hours after the production using the measurement method described below. The results are shown in Table 1.

Method for Measuring Surface Roughness

The surface of the dried pasta was measured using a laser microscope (Laser Microscope VK-870 manufactured by KEYENCE CORPORATION), in which the surface roughness was defined as the average of maximum asperities.

TABLE 1

|  |  | Example 1 | Comparative Example 1 | Comparative Example 2 |
|---|---|---|---|---|
| Molding material for die piece |  | Resin blend of 90 wt % DURACON and 10 wt % high-density polyethylene | Stainless steel | Brass |
| Contact angle (degrees) |  | 66 | 57 | 58 |
| Water absorption (%) |  | 0.12 | 0.01 | 0.01 |
| Surface roughness (μm) of dried pasta | | | | |
| Measurement time (hours) | 0 | 36 | 62 | 53 |
|  | 24 | 32 | 57 | 48 |
|  | 48 | 35 | 52 | 43 |
|  | 72 | 35 | 47 | 40 |
|  | 96 | 35 | 43 | 37 |
|  | 120 | 37 | 40 | 35 |

Table 1 shows the results of the measurement of the surface roughness of the dried pasta. As is evident from the results, the surface roughness (degree of surface roughness) of the dried pasta was almost constant from immediately after the start of the production (0 hours) to 120 hours after the production in Example 1, where the die piece for extrusion molded noodles of the invention was used, and dried pasta having a suitable surface roughness was produced over a long period of time in Example 1. In contrast, the surface roughness of the dried pasta decreased over time in all of Comparative Examples 1 and 2, where the die piece used had a smaller contact angle, and stable production of dried pasta having a suitable surface roughness was difficult in Comparative Examples 1 and 2.

Examples 2 and 3

Each die piece for extrusion molded noodles with the same shape and size was formed in the same manner as in Example 1, except that the molding material shown in Table 2 was used instead. The contact angle and water absorption of each formed die piece are shown in Table 2.

Dried pasta was produced as in Example 1, except that each formed die piece was used instead.

The surface roughness (degree of surface roughness) of the dried pasta produced in each of Examples 2 and 3 was measured immediately after the start of the production (0 hours) and 24 hours, 48 hours, and 120 hours after the production in the same manner as in Example 1. The results are shown in Table 2.

TABLE 2

|  |  | Example 2 | Example 3 |
|---|---|---|---|
| Molding material for die piece |  | Resin blend of 80 wt % DURACON and 20 wt % high-density polyethylene | Resin blend of 70 wt % DURACON and 30 wt % high-density polyethylene |
| Contact angle (degrees) |  | 71 | 69 |
| Water absorption (%) |  | 0.04 | 0.08 |
| Surface roughness (μm) of dried pasta | | | |
| Measurement time (hours) | 0 | 28 | 34 |
|  | 24 | 29 | 35 |
|  | 48 | 29 | 33 |
|  | 120 | 28 | 33 |

Example 4

A die piece for extrusion molded noodles with the same shape and size was formed in the same manner as in Example 1, except that the molding material shown in Table 3 was used instead. The contact angle and water absorption of the formed die piece are shown in Table 3.

Dried pasta was produced as in Example 1, except that the formed die piece was used instead.

The surface roughness (degree of surface roughness) of the dried pasta produced in Example 4 was measured immediately after the start of the production (0 hours) and 24 hours, 48 hours, and 120 hours after the production in the same manner as in Example 1. The results are shown in Table 3.

TABLE 3

| | Example 4 |
|---|---|
| Molding material for die piece | Resin blend of 80 wt % DURACON and 20 wt % Teflon powder |
| Contact angle (degrees) | 73 |
| Water absorption (%) | 0.06 |
| Surface roughness (μm) of dried pasta | |
| Measurement time (hours)  0 | 24 |
| 24 | 24 |
| 48 | 25 |
| 120 | 25 |

The invention claimed is:

1. A die piece for extrusion molded noodles, wherein a contact angle of a water droplet on a die piece surface is 61 to 73 degrees and a water absorption of the die piece is 0.01 to 0.15% by weight after the die piece is immersed in water for 24 hours, wherein a synthetic resin of the molding material for the die piece is a resin blend of 70 to 95% by weight of polyacetal and 5 to 30% by weight of high-density polyethylene.

2. The die piece for extrusion molded noodles of claim 1, wherein the synthetic resin of the molding material for the die piece is a resin blend of 90% by weight of polyacetal and 10% by weight of high-density polyethylene.

3. The die piece for extrusion molded noodles of claim 2, wherein the contact angle of a water droplet on a die piece surface is 66 degrees and a water absorption of the die piece is 0.12% by weight after the die piece is immersed in water for 24 hours.

4. The die piece for extrusion molded noodles of claim 1, wherein the synthetic resin of the molding material for the die piece is a resin blend of 80% by weight of polyacetal and 20% by weight of high-density polyethylene.

5. The die piece for extrusion molded noodles of claim 4, wherein the contact angle of a water droplet on a die piece surface is 71 degrees and a water absorption of the die piece is 0.04% by weight after the die piece is immersed in water for 24 hours.

6. The die piece for extrusion molded noodles of claim 1, wherein the synthetic resin of the molding material for the die piece is a resin blend of 70% by weight of polyacetal and 30% by weight of high-density polyethylene.

7. The die piece for extrusion molded noodles of claim 6, wherein the contact angle of a water droplet on a die piece surface is 69 degrees and a water absorption of the die piece is 0.08% by weight after the die piece is immersed in water for 24 hours.

8. The die piece for extrusion molded noodles of claim 1, wherein the contact angle of a water droplet on a die piece surface is 66 to 72 degrees and a water absorption of the die piece is 0.04 to 0.12% by weight after the die piece is immersed in water for 24 hours.

* * * * *